(12) United States Patent
Hsu

(10) Patent No.: US 7,572,111 B2
(45) Date of Patent: Aug. 11, 2009

(54) MULTI-FUNCTIONAL ROTATING MEANS OF ELECTRIC FAN

(76) Inventor: Sam Hsu, No. 13, Alley 86, Lane 412, Jennshin Rd., Taichung City (TW)

( * ) Notice: Subject to any disclaimer, the term of this patent is extended or adjusted under 35 U.S.C. 154(b) by 596 days.

(21) Appl. No.: 11/317,739

(22) Filed: Dec. 23, 2005

(65) Prior Publication Data
US 2007/0148012 A1    Jun. 28, 2007

(51) Int. Cl.
F04B 23/00    (2006.01)
G09G 3/04    (2006.01)
F01D 25/00    (2006.01)

(52) U.S. Cl. .............................. 417/313; 345/31; 416/5

(58) Field of Classification Search .................. 417/313; 345/31; 416/5, 572
See application file for complete search history.

(56) References Cited

U.S. PATENT DOCUMENTS 6,175,354 B1 *   1/2001   Blissett et al. .............. 345/110
6,183,200 B1 *   2/2001   Chang .................... 416/146 R
7,121,697 B2 *  10/2006   Hsu ........................... 362/386
2005/0116477 A1 *   6/2005   Fang .......................... 290/44
2006/0120063 A1 *   6/2006   Lai ............................. 362/96

* cited by examiner

Primary Examiner—Charles G Freay

(57) ABSTRACT

A rotating assembly for electric fan in one embodiment includes a rotating member provided on an end of the rotating shaft for fastening the fan blades and including a protrusion extended oppositely the rotating shaft, and a coil formed around the protrusion; a stationary magnetic mechanism formed around an end of the protrusion and including at least one pair of magnetic poles on its inner surface spaced from the coil, and a counterweight formed externally; and a load radially extended from the protrusion, a plurality of light emitting elements, a circuit electrically connected to both the magnetic poles and the coil, and a controller electrically connected to the circuit for controlling an activation of the light emitting elements. Activating the electric fan will cause the light emitting elements to emit light. In another embodiment, negative ions are generated.

3 Claims, 7 Drawing Sheets

MULTI-FUNCTIONAL ROTATING MEANS OF ELECTRIC FAN

BACKGROUND OF THE INVENTION

1. Field of Invention

The present invention relates to electric fans and more particularly to an electric fan having a multi-functional rotating member.

2. Related Art

Electric fans (e.g., floor fans) are useful in providing a moving air stream for cooling. Typically, a rotating member mounted on an end of a rotating shaft of electric fan motor is for fastening fan blades only. Thus, continuing improvements in the exploitation of the rotating member of electric fan are constantly being sought.

SUMMARY OF THE INVENTION

It is therefore an object of the present invention to provide a rotating assembly mounted in an electric fan including a motor having a rotating shaft, and a plurality of fan blades, the rotating assembly comprising a rotating member provided on an end of the rotating shaft for fastening the fan blades and including a protrusion extended oppositely the rotating shaft, and a coil formed around the protrusion; a stationary magnetic mechanism formed around an end of the protrusion and including at least one pair of magnetic poles on its inner surface spaced from the coil, and a counterweight formed externally; and a load radially extended from the protrusion, a plurality of light emitting elements, a circuit electrically connected to both the magnetic poles and the coil, and a controller electrically connected to the circuit for controlling an activation of the light emitting elements; whereby activating the electric fan will rotate the fan blades, the rotating member, the load, and the coil for generating an induced electric current on the coil and supplying same to the circuit, the controller, and the light emitting elements to emit light.

In one aspect of the present invention each of the light emitting elements is a LED (light emitting diode).

In another aspect of the present invention the rotating member further comprises a plurality of first holes in communication with the external, a negative ion generator, a plurality of anodes on the negative ion generator, and a cathode having a plurality of second holes put on the anodes such that activating the electric fan will rotate the fan blades, the rotating member, the load, and the coil for generating an induced electric current on the coil and supplying same to the circuit, the controller, the negative ion generator, and the cathode for generating negative ions by interacting the anodes and the cathode and exiting the ions through the first holes.

The above and other objects, features and advantages of the present invention will become apparent from the following detailed description taken with the accompanying drawings.

DETAILED DESCRIPTION OF THE INVENTION

Figure 1:
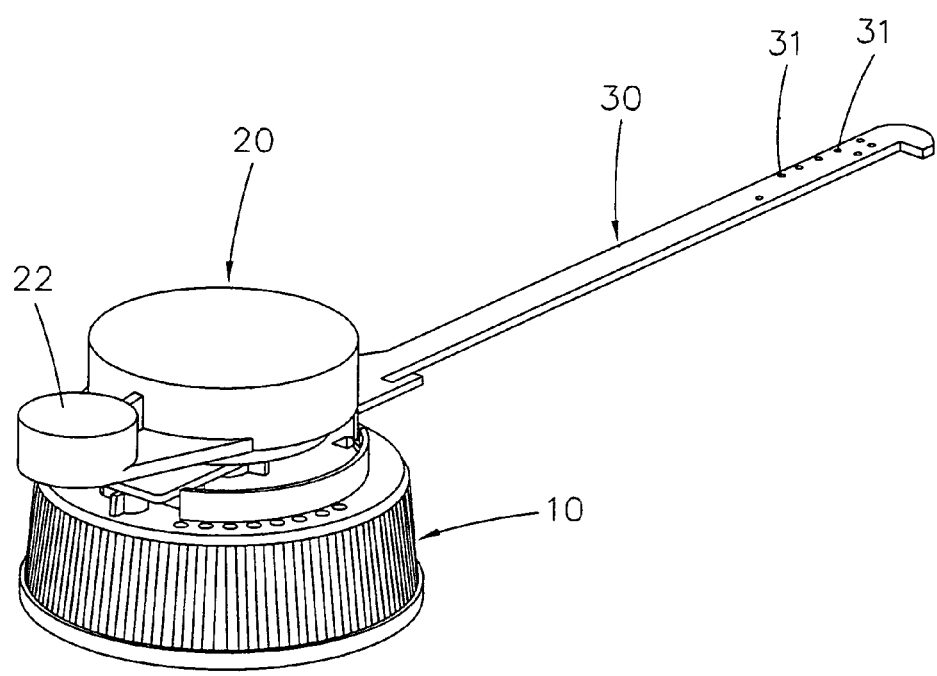
FIG. 1 is a perspective view of a first preferred embodiment of rotating assembly of electric fan according to the invention.
Figure 2:
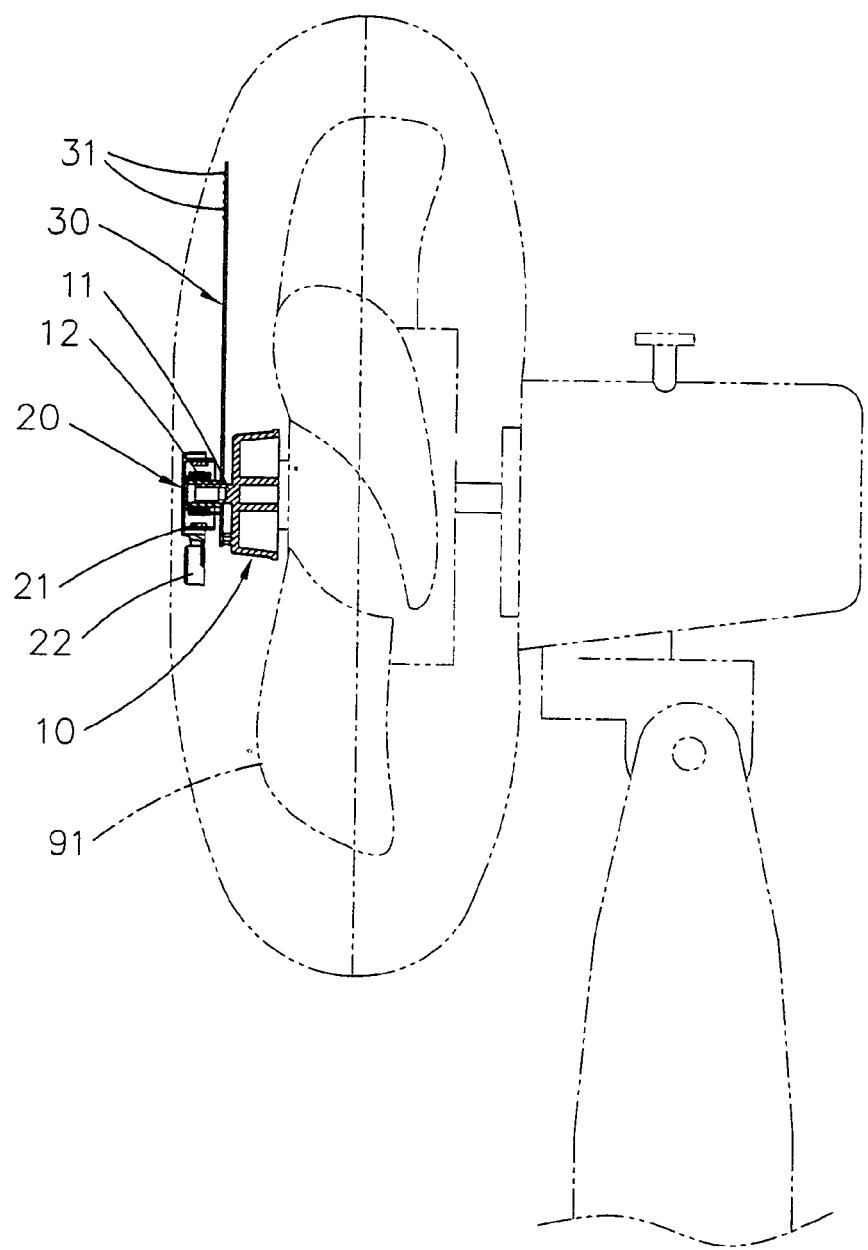
FIG. 2 is a side view in part section of the rotating assembly mounted in an electric fan.
Figure 3:
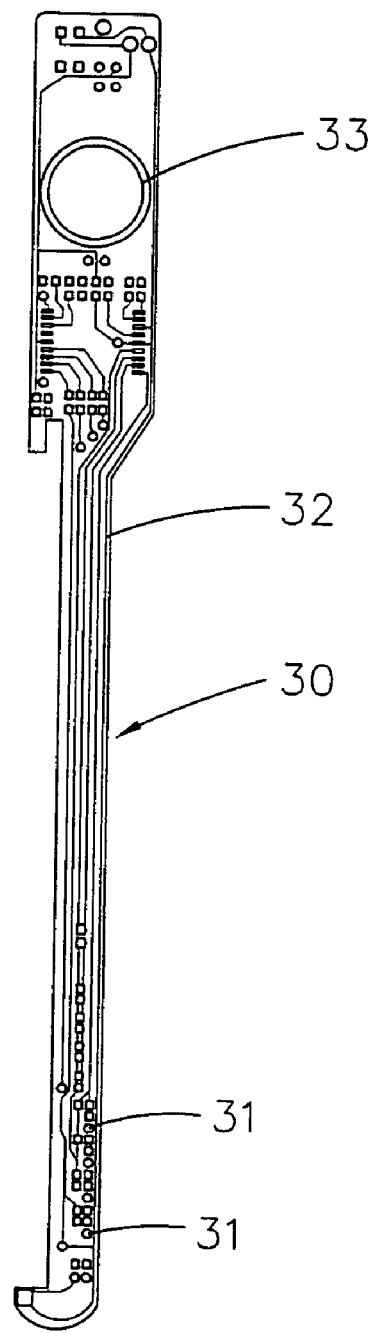
FIG. 3 is a top plan view of the exploded rotating assembly depicting details of its circuitry.

Referring to FIGS. 1 to 3, a rotating assembly mounted in an electric fan in accordance with a first preferred embodiment of the invention is shown. The rotating assembly comprises a rotating member 10 mounted on an end of a rotating shaft of a motor for fastening a plurality of fan blades 91 such that both the rotating member 10 and the fan blades 91 may co-rotate. The rotating member 10 comprises a protrusion 91 opposite the rotating shaft, and a coil 12 wrapped around the protrusion 91. The rotating assembly further comprises a stationary magnetic mechanism 20 formed around an end of the protrusion 91, the magnetic mechanism 20 including at least one pair of magnetic poles 21 on an inner surface of the circular magnetic mechanism 20 spaced from the coil 12, and a counterweight 22 formed externally. The rotating assembly further comprises an elongated load 30 extended radially from the protrusion 91, a plurality of light emitting elements (e.g., LED (light emitting diodes)) 31, a circuit 32 electrically connected to both the magnetic poles 21 and the coil 12, and a controller 33 electrically connected to the circuit 32 for controlling the activation of the light emitting elements 31.

Figure 4:
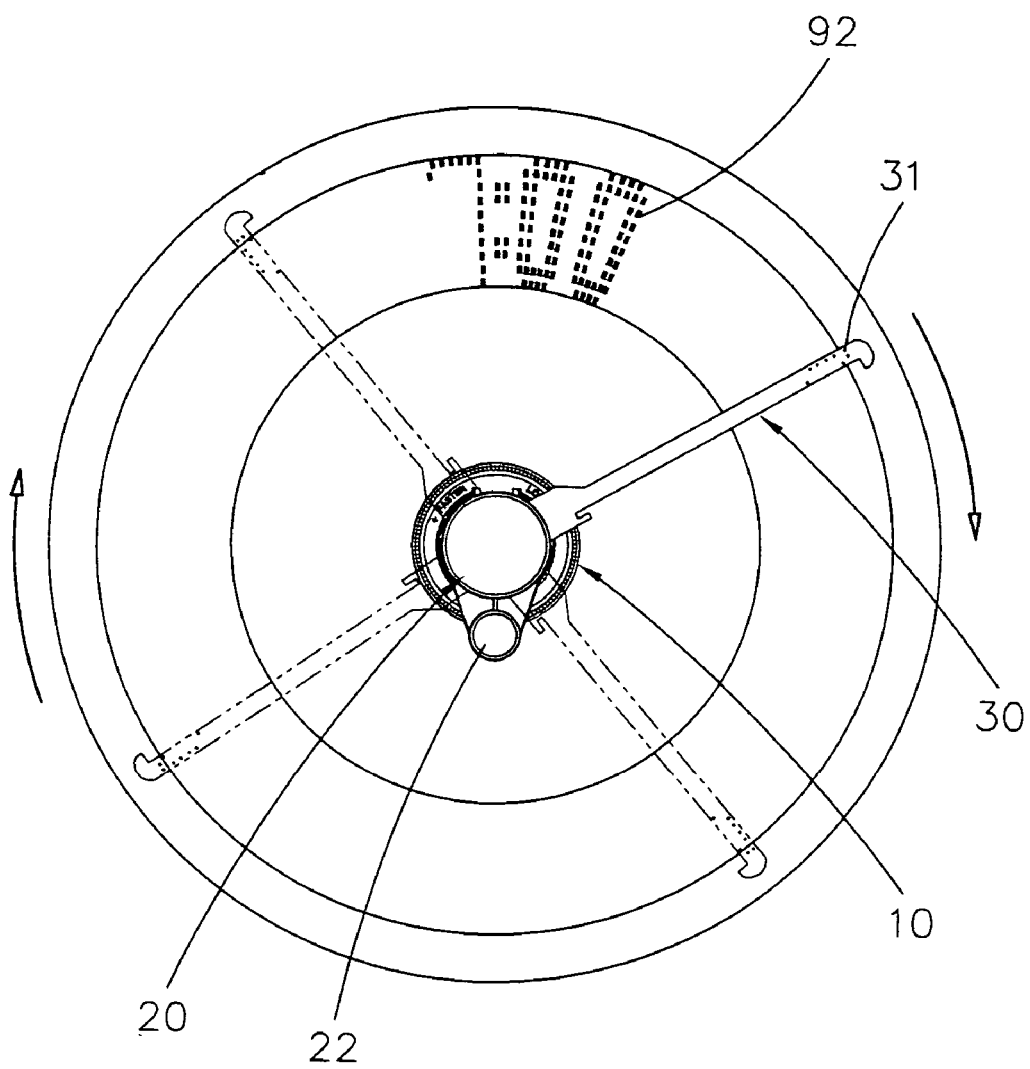
FIG. 4 is a front view of fan enclosure showing time being shown on rotating fan blades according to a first configuration of the invention.
Figure 5:
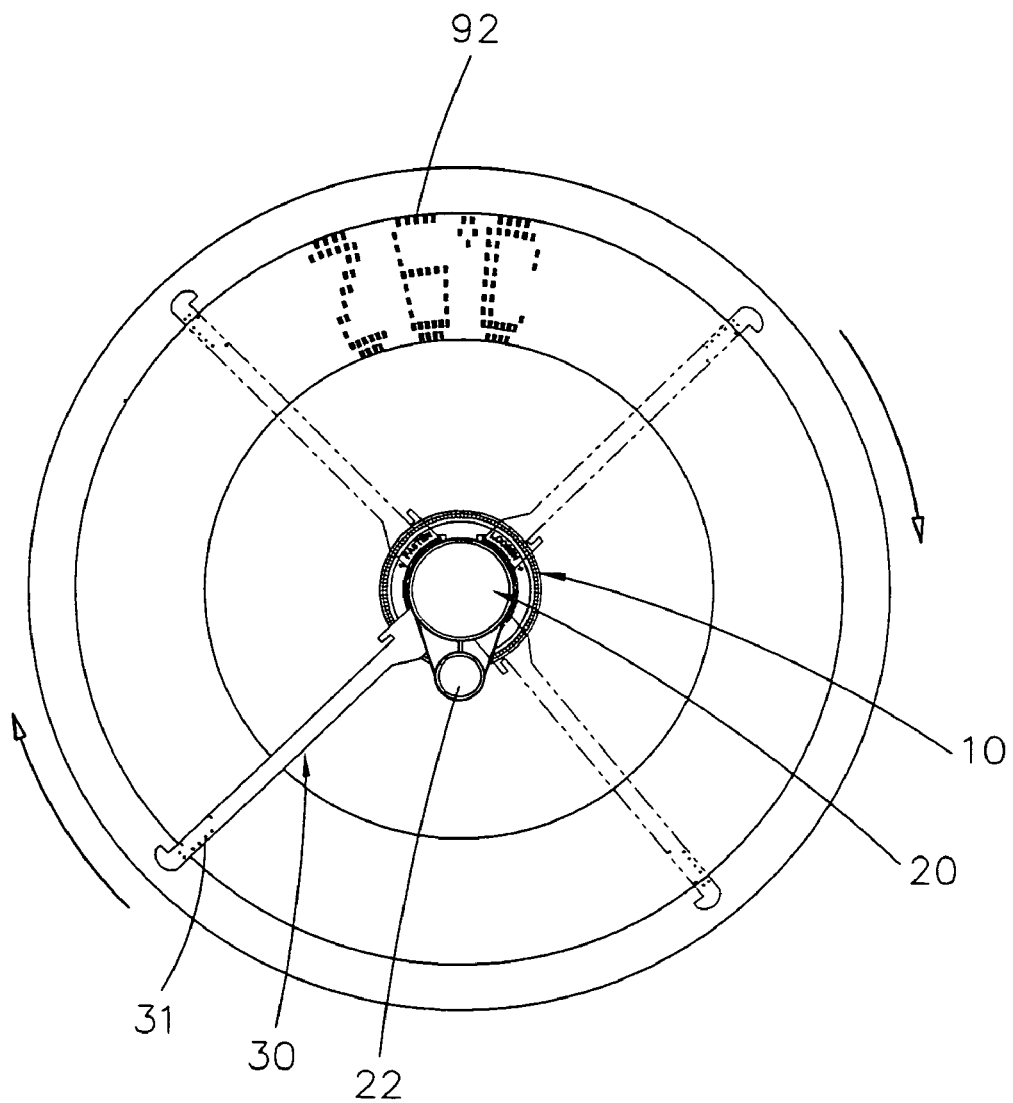
FIG. 5 is a view similar to FIG. 4 showing temperature being shown on the rotating fan blades according to a second configuration of the invention.

Referring to FIGS. 4 and 5, both the fan blades 91 and the rotating member 10 rotate in response to activation of an electric fan. Also, both the load 30 and the coil 12 rotate. An induced electric current is thus generated on the coil 12 as magnetic flux from the coil 12 to the stationary magnetic poles 21 is cut by the rotating coil 12. The current is then supplied to the circuit 32, the controller 33, and the light emitting elements 31. As a result, the light emitting elements 31 emit light. An optical illusion is created due to rapid rotation of the light emitting elements 31. For example, either time 7:00 (see FIG. 4) or temperature 26° C. (see FIG. 5) is continuously shown on a front face of fan enclosure. Note that a thermometer is required to mount in the electric fan and the thermometer is required to provide temperature data to the controller 33. Moreover, the controller 33 is required to program in advance.

Figure 6:
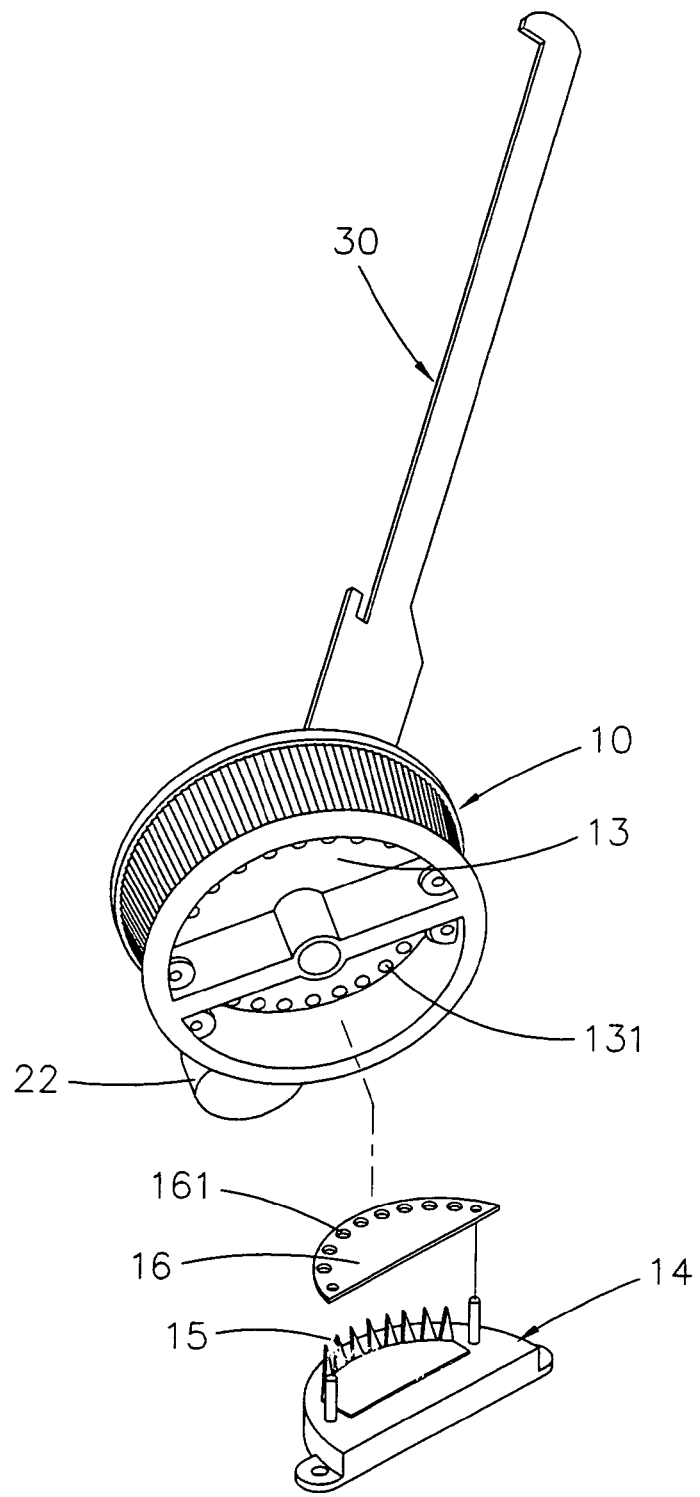
FIG. 6 is an exploded view of a second preferred embodiment of rotating assembly of electric fan according to the invention.
Figure 7:
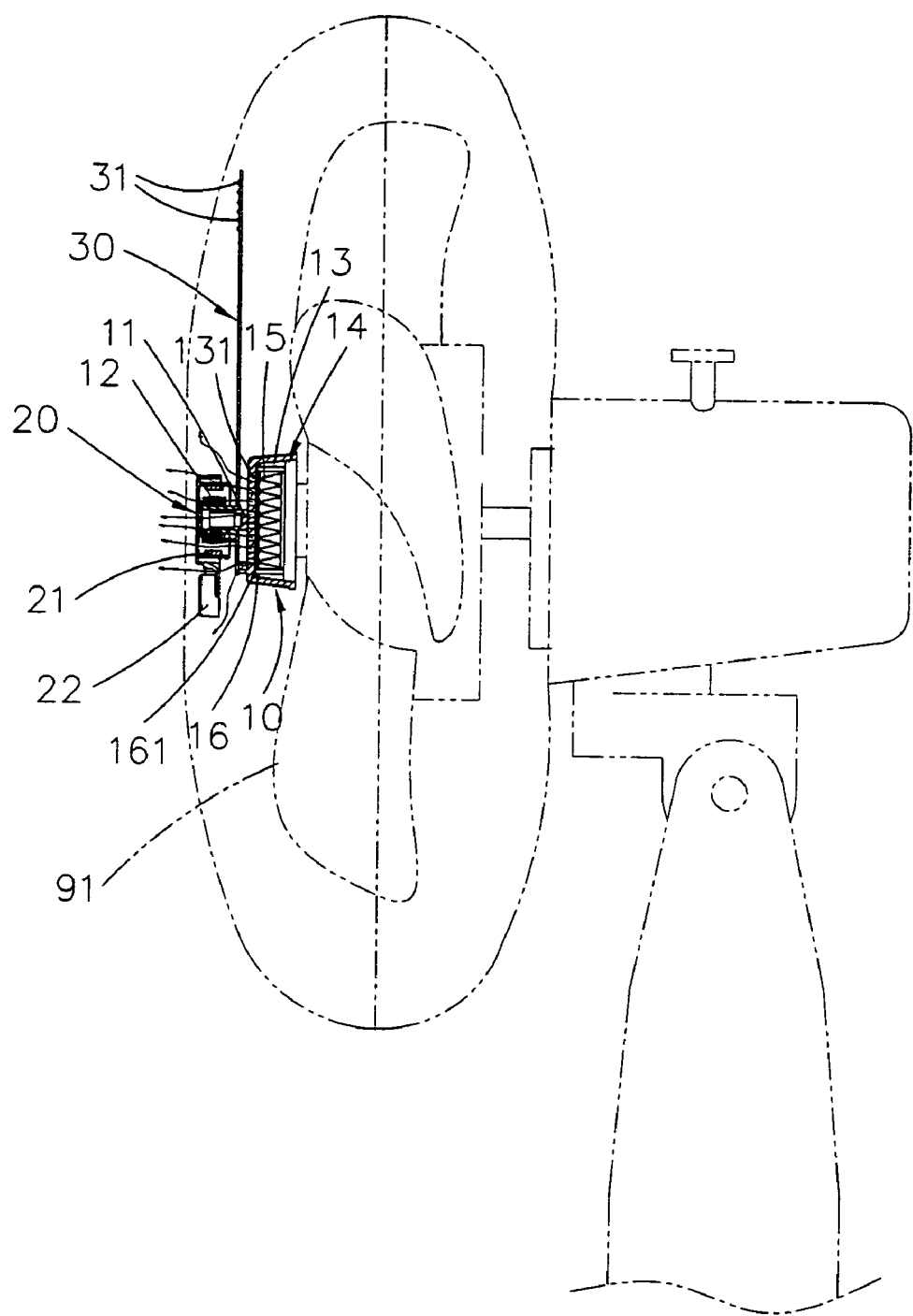
FIG. 7 is a side view in part section of the rotating assembly of FIG. 6 mounted in an electric fan being operating.

Referring to FIGS. 6 and 7, a rotating assembly mounted in an electric fan in accordance with a second preferred embodiment of the invention is shown. The characteristics of the second preferred embodiment are detailed below. An internal space 13 is defined by the rotating member 10. Within the space 13 there are provided a plurality of first holes 131 in communication with the external, a negative ion generator 14, a plurality of anodes 15 on the negative ion generator 14, and a cathode 16 having a plurality of second holes 161 put on the anodes 15. In operation as shown in FIG. 7, both the fan blades 91 and the rotating member 10 rotate in response to activation of an electric fan. Also, both the load 30 and the coil 12 rotate. An induced electric current is thus generated on the coil 12 as magnetic flux from the coil 12 to the stationary magnetic poles 21 is cut by the rotating coil 12. The current is then supplied to both the negative ion generator 14 and the cathode 16. Negative ions are thus generated by the interaction of the anodes 15 and the cathode 16. Eventually, the ions exit the electric fan through the first holes 131.

While the invention herein disclosed has been described by means of specific embodiments, numerous modifications and variations could be made thereto by those skilled in the art without departing from the scope and spirit of the invention set forth in the claims.

What is claimed is:

1. A rotating assembly for an electric fan including a motor having a rotating shaft with a plurality of fan blades, the rotating assembly comprising:
   a rotating member for mounting on an end of the rotating shaft, and separate from the fan blades and on the opposite side from the motor, having a protrusion coaxially extended oppositely the rotating shaft, and a generating coil formed around the protrusion;
   a substantially stationary magnetic mechanism formed around an end of the protrusion and including at least one pair of magnetic poles on its inner surface opposing and spaced from the coil, and with a counterweight formed externally; and
   a load radially extended from the protrusion, having a plurality of light emitting elements, a circuit electrically connected to both the magnetic poles and the coil, and a controller electrically connected to the circuit for controlling an activation of the light emitting elements;
   wherein when activated the electric fan will rotate the fan blades, the rotating member, the load, and the coil which will generate an induced electric current on the coil and supply current to the circuit, the controller, and the light emitting elements to emit light.

2. The rotating assembly of claim 1, wherein each of the light emitting elements is a LED (light emitting diode).

3. The rotating assembly of claim 1, wherein the rotating member further comprises a plurality of first holes in communication with an external environment, a negative ion generator, a plurality of anodes on the negative ion generator, and a cathode having a plurality of second holes put on the anodes such that activating the electric fan will rotate the fan blades, the rotating member, the load, and the coil for generating an induced electric current on the coil and supplying same to the circuit, the controller, the negative ion generator, and the cathode for generating negative ions by interacting the anodes and the cathode and exiting the ions through the first holes.

* * * * *